July 11, 1961 J. D. LAWRENCE, JR 2,992,409

TRANSISTOR SELECTION ARRAY AND DRIVE SYSTEM

Filed Aug. 9, 1955 2 Sheets-Sheet 1

INVENTOR.
JOSEPH D. LAWRENCE, JR.
BY
Charles G. English
AGENT

July 11, 1961 J. D. LAWRENCE, JR 2,992,409

TRANSISTOR SELECTION ARRAY AND DRIVE SYSTEM

Filed Aug. 9, 1955 2 Sheets-Sheet 2

INVENTOR.
JOSEPH D. LAWRENCE, JR.
BY
Charles C. English
AGENT

United States Patent Office 2,992,409

Patented July 11, 1961

2,992,409

TRANSISTOR SELECTION ARRAY AND DRIVE SYSTEM

Joseph D. Lawrence, Jr., Philadelphia, Pa., assignor to Sperry Rand Corporation, New York, N.Y., a corporation of Delaware Filed Aug. 9, 1955, Ser. No. 527,221
15 Claims. (Cl. 340—166)

The present invention relates to switching matrices or function tables and is more particularly concerned with such devices employing transistors for the selective control of current flow to a plurality of loads. In this respect the present invention provides a novel transistor function table and further provides an improved method of cascading such function tables to drive a plurality of loads, such as a coincident current memory, with a minimum of inputs to the function tables employed.

Function tables are employed in many switching arrangements and find considerable utility, for instance in digital computation devices. For the most part, these switching matrices or function tables employ diode elements, and driving sources are utilized for selectively coupling energy via the said diodes to selected ones of a plurality of output lines thereby to drive loads coupled to the said lines. Because of the use of such diode elements, function tables in the past have acted to attenuate energy from the driving sources, thus imposing certain minimum restrictions on the driving sources which may be employed as well as upon the utilization which may be made of the overall system.

The present invention serves to obviate these diffculties and provides a novel function table arrangement utilizing suitably disposed transistor elements for selectively energizing output lines in response to preselected input signals whereby the function table has power gain rather than the attenuation experienced heretofore. In addition, the present invention so disposes the several transistor elements employed, with respect to a plurality of input and output lines, that fewer transistors per output line are utilized than has been the case in other types of function tables.

In accordance with a further form of the present invention, means are provided for so coupling function tables to a load array, such as a coincident current memory, that the function tables act as drive means for the said load array; and in addition, novel switching circuits are employed in combination with the function tables and the load array whereby the overall system may operate with a theoretical minimum of binary inputs.

It is accordingly an object of the present invention to provide novel switching matrices or function tables.

A further object of the present invention resides in the provision of an improved function table employing transistor elements.

A still further object of the present invention resides in a novel arrangement whereby function tables may be cascaded.

Still a further object of the present invention resides in the provision of a coincident current memory utilizing transistor function tables for driving purposes.

Another object of the present invention resides in the provision of a novel function table exhibiting power gain rather than the attenuation characteristic of function tables known heretofore whereby the said function table may be employed for driving a plurality of loads.

A further object of the present invention resides in the provision of novel function tables which may operate in response to signal inputs of lower power level than has been the case heretofore.

Still another object of the present invention resides in the provision of novel function tables and drive systems employing fewer switching elements than has been the case heretofore.

A still further object of the present invention resides in the provision of novel transistor networks capable of effecting bidirectional flow through a load, such as a coincident current memory cell.

A still further object of the present invention resides in the provision of a novel transistor network capable of responding to a theoretical minimum of signal inputs, for instance of the binary digital type, for driving a load array such as a coincident current memory.

In accordance with the foregoing objects and advantages of the present invention, function tables may comprise a plurality of horizontal and vertical input lines, and a transistor may be connected to a horizontal and vertical line at each intersection thereof. Outputs may be selectively obtained from a given transistor element by driving the horizontal and vertical line associated with a given transistor whereby two elements of the said transistor are driven to produce an output at the third element thereof. Such transistor function tables may be cascaded and may act as drive inputs to more complex load arrays, or other transistor function tables; and in addition, switching networks may be employed for selectively driving, via the drive transistor function tables, the said more complex load arrays.

The foregoing objects, advantages, construction and operation of the present invention will become more readily apparent from the following description and accompanying drawings, in which.

Figure 1:
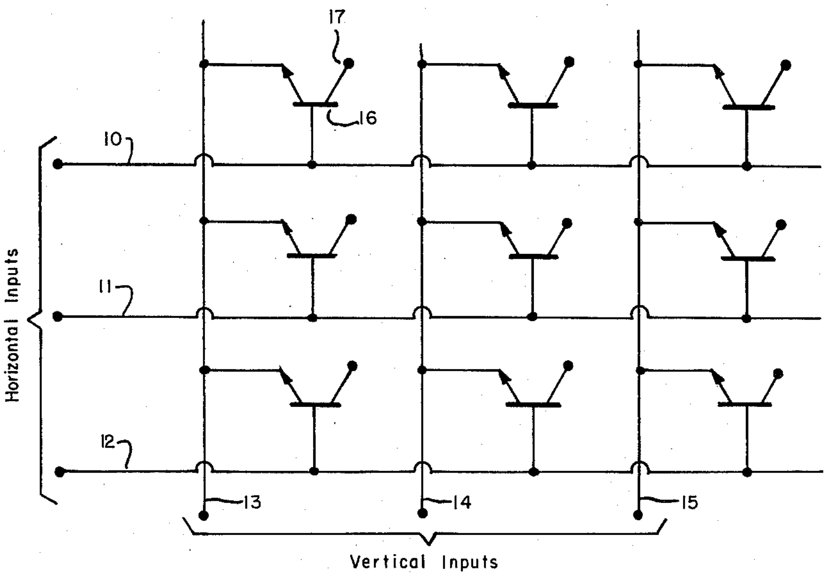
FIGURE 1 is a schematic diagram of a function table constructed in accordance with a preferred embodiment of the present invention.

Referring now to FIGURE 1, it will be seen that, in accordance with the present invention, a transistor function table may comprise an array of horizontal input lines 10, 11 and 12 and an array of vertical input lines 13, 14 and 15. A plurality of transistors are disposed, as shown, the said transistors being respectively located at the several intersections of the horizontal and vertical input lines with one element of each transistor being coupled to one of the said horizontal input lines while another element of the said transistor is coupled to one of the said vertical input lines. To select an output, current may be passed into one of the horizontal lines and taken out of one of the vertical lines.

Thus, referring to the transistor element 16 by way of example, it will be seen that by appropriately switching horizontal input line 10 and vertical input line 13, current may be passed into the said line 10 and thence through transistor 16 and out of vertical input line 13. The conduction of lines 10 and 13 accordingly effects an output from transistor 16 which may be taken at its collector, for instance at an output point 17. By analogy, it will be seen that the selective switching of any one horizontal input line and any one vertical input line will uniquely select, for output purposes, the single transistor disposed at the intersection of the selected horizontal and vertical line. The three horizontal input lines and three vertical input lines thus provide nine possible unique outputs in response to the selection of lines being switched. By appropriately increasing or decreasing the number of input lines, any desired number of possible outputs may be achieved.

In the particular example shown in FIGURE 1, NPN type transistors have been employed; but it will be appreciated that the device will also operate as described with PNP type transistors and with either junction or point contact transistors or with double base diodes. These possible modifications are accordingly meant to be included in the generic representation of FIGURE 1. In addition, it will be appreciated that in the arrangement of FIGURE 1, a given transistor is selected for output purposes by switching two of its electrodes while the output is taken from a third electrode. In FIGURE 1, the two electrodes switched in each of the transistors comprise the base and emitter of the transistor while the output is taken from the transistor collector; but this is not necessary and in fact any two terminals can be connected to input lines, while the output is taken from the remaining terminal of the transistor.

Function tables of the type shown in FIGURE 1 may be cascaded to reduce the number of inputs required for selection purposes, and such cascaded function tables may in turn cooperate with selection networks for reducing the number of inputs required to a theoretical minimum. When so arranged, therefore, systems in accordance with the present invention find considerable utility in the driving of load arrays such as coincident current memories; and one such overall system is shown in FIGURE 2.

Figure 2:
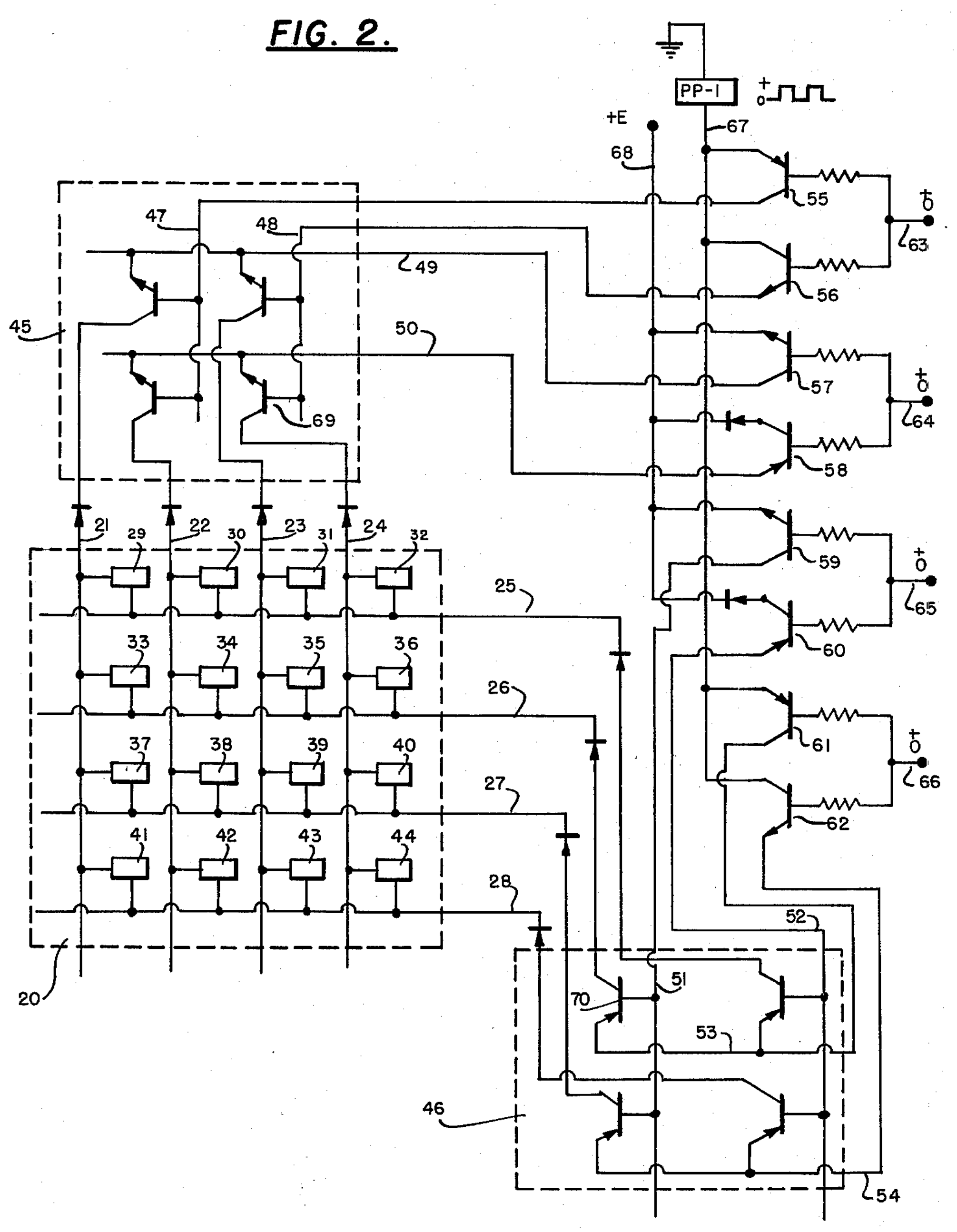
FIGURE 2 is a schematic diagram of a transistor network employing function tables of the type illustrated in FIGURE 1 for the driving of a load array such as a coincident current memory.

Thus, referring to FIGURE 2, it will be seen that a load array 20 may comprise a plurality of vertical input lines 21 through 24 inclusive, and a plurality of horizontal input lines 25 through 28 inclusive. A load is coupled to the intersection of each of the horizontal and vertical input lines of the load array 20, and these loads have been designated 29 through 44 inclusive. While the particular arrangement of FIGURE 2 thus employs a total of sixteen loads, it will be appreciated from the subsequent description, that the principles of the present invention may be applied to load arrays utilizing other numbers of load elements. It will be further appreciated that inasmuch as each load 29 through 44 inclusive is selectively coupled to a single horizontal line and a single vertical line of the load array 20, the said loads 29 through 44 may comprise transistors whereby the system of array 20 assumes a configuration analogous to that of FIGURE 1; and the several load means, such as pluralities of coincident current memory cells, may be coupled to the output terminals of the several transistors employed. The vertical input lines 21 through 24 of load array 20 may be selectively switched by a function table 45 and the horizontal lines 25 through 28 of the said array 20 may also be switched by a further function table 46.

Examination of the function tables 45 and 46 will reveal that they operate in the manner described in reference to FIGURE 1, and as a result, the several arrays, 20, 45 and 46, may be considered as function tables cascaded to one another thereby to reduce the necessary number of inputs to the system. The transistor driving array 45 comprises a pair of vertical switching lines 47 and 48 and a pair of horizontal switching lines 49 and 50. Similarly, the driving array 46 comprises a pair of vertical input lines 51 and 52 and a pair of horizontal driving lines 53 and 54.

The several lines 47 through 54 may be selectively controlled by an input switching circuit comprising transistors 55 through 62 inclusive. The said transistors 55 through 62 are arranged in pairs such as 55—56, 57—58, 59—60 and 61—62; and these pairs of transistors in turn have their bases coupled to a plurality of input control lines 63, 64, 65 and 66. Thus, the overall system utilizes a total of four input lines, namely, 63 through 66 inclusive, for selectively driving any one of sixteen loads, namely, 29 through 44 inclusive; and the said input lines 63 through 66 may in turn be coupled to signal sources, for instance of the type producing a unique binary digital output for switching any one of the loads 29 through 44 inclusive.

Each group of input transistors 55—56, 57—58, etc., comprises a PNP type transistor and an NPN type transistor. The signal input applied to each of terminals 63 through 66 further may assume either of two potentials, namely, a normal quiescent level of zero or ground potential, or in the alternative, a positive switching potential. By causing the input lines 63 through 66 to be at either the zero or positive potential described, therefore, and due to the different or complementary types of transistors used in each of the input pairs of transistors, only one of the two transistors comprising each input pair will be rendered conductive in response to a given input potential level on the input lines 63 through 66.

Transistors 55, 56, 61 and 62 have one element thereof coupled to a drive line 67, and the said drive line in turn includes a source of power pulses PP–1 exhibiting regularly occurring positive-going excursions from a base level of zero. The other input transistors, namely 57, 58, 59 and 60, have one of their elements coupled to a further line 68, returned to a small positive potential +E. Each of the input transistors 55 through 62 is utilized to control one of the input lines 47 through 54 of the drive arrays 45 and 46. Thus, transistor 55 selectively drives line 47, transistor 56 selectively drives line 48, transistor 57 selectively drives line 49, etc.

It will be appreciated from the foregoing discussion that the driving arrays 45 and 46 produce an output only when both a horizontal and vertical input line thereof are energized. Inasmuch as the vertical lines 47 and 48 of array 45 are switched by transistors 55 and 56, and further inasmuch as horizontal lines 53 and 54 are switched by transistors 61 and 62, no output may be obtained from either of the driving arrays 45 or 46 in the absence of a positive-going power pulse from the source PP–1. It should be noted that inasmuch as transistors 57 through 60 are not controlled by the source PP–1, at least one transistor in each of the groups 57—58 and 59—60 may be in a normally conductive state regardless of the input signal applied to terminals 64 and 65. But, inasmuch as the outputs of transistors 57 through 60 cannot control both a horizontal and a vertical line of either of the drive arrays 45 or 46, no output will be obtained from either of these arrays 45 or 46 in the absence of a further output from one of the transistors 55—56 or 61—62, in response to a positive-going power pulse from source PP–1, in the manner described.

The operation of the overall system shown in FIGURE 2 can be understood best by assuming a given input signal configuration on lines 63 through 66, and by tracing the effect of such an input signal through the overall array to a given output. Thus, by way of example, let us assume that positive-going input signals are applied to lines 63 and 65, while lines 64 and 66 remain at their quiescent level of zero potential. Upon application of a positive-going power pulse from source PP–1, a current is driven into line 67. Since the base of PNP type transistor 55 is positive (due to the positive input on line 63), transistor 55 will not conduct. However, transistor 56, being of the NPN type, and having its base switched positively by the input on line 63, will conduct. The base of NPN transistor 57 is at zero potential, inasmuch as no positive-going signal has been applied to line 64, and the emitter of the said transistor 57 is at the small opsitive potential +E on line 68 so that transistor 57 will not conduct. On the other hand, PNP transistor 58 has its base at zero potential and will conduct if its emitter goes positive. In a like manner, transistors 59 and 61 will conduct, while transistors 60 and 62 will be non-conductive during the application of a positive-going power pulse from source PP–1.

Inasmuch as a given transistor in the drive arrays 45 and 46 produces an output only when a horizontal and a vertical line coupled to the said transistor are each switched on, the aforedescribed output state of transistors 55 through 62, in response to inputs on lines 63 and 65, will render one transistor only in each of the arrays 45 and 46 conductive. To clarify this, it will be seen that the conduction of transistors 56 and 58 serves to drive vertical input line 48 and horizontal input line 50 of array 45 whereby only transistor 69 of the array 45 is switched to a conducting state. Similarly, the conduction of transistors 59 and 61 drive vertical input line 51 and horizontal input line 53 of the array 46 whereby only transistor 70 of the said array 46 is rendered conductive. Thus, due to the particular input configuration on lines 63 through 66, transistor 69 in array 45 will produce an output which output serves to drive vertical line 24 of array 20 and similarly, only transistor 70 of array 46 will produce an output which will tend to drive horizontal line 26 of the said array 20. This driving of lines 24 and 26 selects the load 36 of array 20 for output producing purposes.

It will be appreciated that due to the two possible potential levels at each of the lines 63 through 66, a total of sixteen possible signal input configurations may be applied to the said lines 63 through 66; and each of these sixteen input configurations uniquely selects, for output, one of the loads 29 through 44. Thus, the selection of sixteen loads is effected by the theoretical minimum of digital inputs, namely four.

In certain applications, such as coincident current memories, it may be desirable to selectively effect bidirectional current flow through each of the loads 29 through 44. The over-all system shown in FIGURE 2 may be utilized to effect this operation, and in such an event each of the loads 29 through 44 may assume a configuration such as that shown in FIGURE 3.

Figure 3:
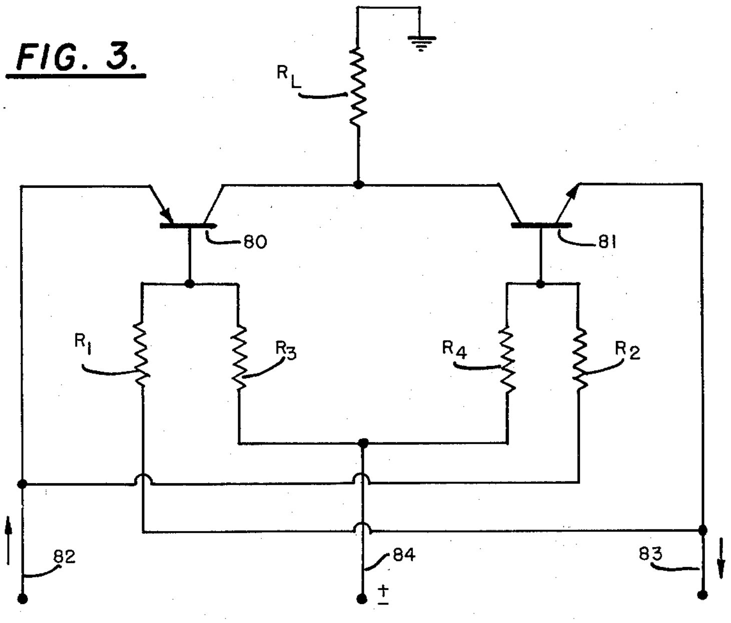
FIGURE 3 is a schematic diagram of a novel transistor network which may be employed for effecting bidirectional current flow through the several loads of the load array shown in FIGURE 2.

Thus, referring to FIGURE 3, it will be seen that a load $R_L$ may be selectively switched by a network comprising a PNP type transistor 80 and an NPN type transistor 81. The collectors of the transistors are connected to one another and to one end of the load $R_L$, as shown; and the emitters of the transistors 80 and 81 are coupled to input lines 82 and 83, respectively. The base of transistor 80 is coupled via impedance R1 to the input line 83, while the base of transistor 81 is coupled to the input line 82 via a further impedance R2. The bases of the said transistors 80 and 81 are also coupled via impedances R3 and R4, respectively, to a control input terminal 84. When employed in a system such as that described in reference to FIGURE 2, one input line 82 may be coupled to a given control line of the array 20, such as the vertical line 21; while the other input line 83 may be coupled to a further input line, such as the horizontal line 25 of the array 20; and when so disposed, the system shown in FIGURE 3 would provide a substitution for the load 29. Control terminal 84 may be selectively switched to either a positive or negative potential thereby to control which of transistors 80 or 81 is rendered conducive in response to the simultaneous switching of input lines 82 and 83; and this selection of one or the other of transistors 80 or 81 for conduction in turn determines the direction of current flow through load $R_L$. When an overall array of bidirectional loads of the type shown in FIGURE 3 is substituted for the several loads 29 through 44, the several control terminals 84 may be connected to one another, whereby, by the addition of one further input control terminal, the direction of current flow through the selected load can be predetermined regardless of which of these loads is actually selected.

In the operation of the circuit shown in FIGURE 3, one or the other of transistors 80 and 81 is rendered conductive when current is caused to pass into input line 82 and out of input line 83; and which of these transistors is so selected is controlled by the potential state of line 84 whereby control signals on line 84 in turn control the direction of current flow through load $R_L$. By way of example, if we should assume that line 84 is positive, transistor 80 will be cut off, while transistor 81 will be conductive if lines 82 and 83 are conductive. Current flow into line 82 will thus pass through impedance R2 and thence through transistor 81 to line 83 whereby an output will appear on the collector of transistor 81 and current will flow from ground in a downward direction through load $R_L$ and into the collector of transistor 81. If, on the other hand, control terminal 84 should be negative in potential, transistor 80 will be rendered conductive when lines 82 and 83 are conductive, while transistor 81 will be cut off. Therefore, current flow into line 82 will pass into the emitter of transistor 80 where it will branch, some passing via impedance R1 to line 83 and some flowing out of the collector of transistor 80 and in an upward direction through load $R_L$ to ground.

Thus, current is effected in either of two directions through the load $R_L$ and, as mentioned previously, the said load $R_L$ may comprise a plurality of memory cells, for instance of the type employing a substantially rectangular hysteresis core material, whereby the substitution of components, such as has been described in reference to FIGURE 3, in the overall system of FIGURE 2 results in the provision of a coincident current memory capable of effecting bidirectional current flow through the several lines of memory cells in response to a theoretical minimum number of input signals.

While I have described preferred embodiments of the present invention, many variations will be suggested to those skilled in the art. It must be understood, therefore, that the foregoing description is meant to be illusrative only and is no limitative of my invention, and all such variations as are in accord with the principles described are meant to fall within the scope of the appended claims.

Having thus described my invention, I claim:

1. A switching array comprising a plurality of loads, a first plurality of drive lines coupled respectively to one end of each of said plurality of loads, a second plurality of drive lines coupled respectively to the other end of each of said plurality of loads, first drive means coupled to said first plurality of drive lines, second drive means coupled to said second plurality of drive lines, and switching means coupled to said first and second drive means for controlling the drive output thereof, said switching means comprising a plurality of pairs of transistors, the transistors comprising said pairs being complementary in type, a plurality of signal sources each capable of providing signals at two potential levels, means respectively coupling said signal sources to common electrodes of the transistors comprising each pair of transistors thereby to cause selectively one or the other of the transistors comprising each pair to be conductive, said drive means being responsive to the simultaneous conductivity of the selected transistors to effect a drive output to one of said plurality of loads.

2. A switching array comprising a plurality of loads, a plurality of coupling means connected respectively to said loads, a first plurality of drive lines coupled respectively to each of said loads, a second plurality of drive lines coupled respectively to each of said loads, a first array of switching transistors coupled to said first plurality of drive lines, a second array of switching transistors coupled to said second plurality of drive lines, control means coupled to said first and second arrays of switching transistors for rendering preselected transistors conductive in said arrays thereby to direct current flow through a preselected one of said coupling means and loads via preselected ones of said drive lines, each coupling means comprising a pair of further transistor elements, and further control means coupled to said further transistor elements for controlling the conductivity of individual transistors of a selected pair thereof thereby to determine the direction of current flow through a selected load.

3. The array of claim 2 wherein said plurality of loads comprises a coincident current memory.

4. The array of claim 2 wherein the transistors included in each of the pairs of further transistor elements comprise complementary transistors each having first, second and third electrodes, said first electrodes being connected to said loads, said second electrodes being coupled respectively to one of each of said first and second pluralities of drive lines, and said third electrodes being coupled in common to said further control means, said further control means comprising a source of signals capable of providing two potential levels, so that in response to a signal from said source exhibiting either of said two potential levels one transistor only of a selected pair of further transistor elements is rendered conductive.

5. A switching array comprising a plurality of loads, a plurality of input conductors coupled respectively to first ends of said loads, a plurality of return conductors coupled respectively to second ends of said loads so that said input conductors, said loads and said return conductors form a plurality of series circuits, a plurality of transistors coupled respectively to said input and return conductors, said plurality of transistors comprising a first and second pair of transistors wherein each such transistor pair comprises transistors complementary in type, said transistors comprising said pairs having common electrodes coupled to sources of control signals, the control signals from said control signal sources selectively exhibiting two potential levels, a source of power pulses, each transistor of said first transistor pair being placed in a series circuit between said power pulse source and said input conductors, and a source of reference potential, each transistor of said second transistor pair being placed in a series circuit between said reference potential source and said return conductors so that a selected combination of control signals causes one transistor from each of said first and second pairs to become conductive thereby to switch pulses from said power pulse source to a selected input conductor, load and return conductor.

6. The combination of claim 5 wherein the base electrodes of said first pair of transistors are coupled to a first control signal source and the base electrodes of said second pair of transistors are coupled to a second control signal source.

7. The combination of claim 5 wherein the input conductors are coupled respectively to the collector electrode of one transistor to the first pair and to the emitter electrode of the other transistor of said first pair and the return conductors are coupled respectively to the collector electrode of one transistor of the second pair and to the emitter electrode of the other transistor of said second pair.

8. The combination of claim 5 wherein the power pulse source is coupled respectively to the emitter and collector electrodes of the transistors comprising said first pair and the source of reference potential is coupled respectively to the emitter and collector electrodes of the transistors comprising said second pair.

9. The combination of claim 5 wherein said loads comprise further transistors arranged in a matrix each of said further transistors being capable of providing an output.

10. A transistor switching system comprising a first pair of complementary transistors and a second pair of complementary transistors, a plurality of load means each connected in a separate series circuit with the paths of second and third electrodes of one transistor of said first pair and of one transistor of said second pair, means for supplying periodic pulses to said second and third electrode paths and means for supplying combinations of signals between said first and second transistor pairs to control the conductive states of the transistors forming said pairs thereby to render said second and third electrode paths of one transistor from said first pair and one transistor from said second pair conductive to supply periodic pulses to said load series circuits so as to energize the corresponding one of said load means.

11. A switching array comprising a plurality of loads; a first plurality of drive lines coupled respectively to first ends of said loads; a second plurality of drive lines coupled respectively to second ends of said loads; a first drive matrix coupled to said first plurality of drive lines; a second drive matrix coupled to said second plurality of drive lines; each of said first and second drive matrices comprising a plurality of drive elements each having first and second input lines; first and second control matrices each comprising a plurality of pairs of complementary transistors, said transistors having first, second and third electrodes thereon, said first electrodes in each complementary pair being coupled together, a source of control signals coupled to said first electrodes; a source of pulses coupled respectively to the second electrode of one and to the third electrode of the other transistor of each first pair of transistors in each of said first and second control matrices; a reference potential terminal coupled respectively to the second electrode of one and to the third electrode of the other transistor of each second pair of transistors in each of said first and second control matrices, the remaining second and third electrodes from each of said transistor pairs being coupled respectively to said first and second input lines to said drive elements whereby for each combination of control signals a different transistor from each of said pairs is placed in a conductive state, each combination of said conductive transistors being effective to connect said pulse source to the corresponding one of said drive elements in each of said drive matrices, and said selected drive elements coacting in response to a power pulse to drive the corresponding one of said loads.

12. The combination of claim 11 wherein said pulse source is operative to supply a train of periodic pulses.

13. The combination of claim 11 wherein each of said drive elements comprises another transistor.

14. The combination of claim 13 wherein the transistors in said first drive matrix are complementary to the transistors in said second drive matrix.

15. The combination of claim 13 wherein said load comprises first and second transistor matrices, said first matrix transistors being complementary to said second matrix transistors, and a further plurality of loads arranged in a matrix and in series circuits between said first and second matrices whereby the excitation of a single selected transistor from each of said first and second matrices tends to switch said pulses to a selected one of said further plurality of loads.

References Cited in the file of this patent

UNITED STATES PATENTS

| | | |
|---|---|---|
| 2,465,355 | Cook | Mar. 29, 1949 |
| 2,627,039 | MacWilliams | Jan. 27, 1953 |
| 2,686,299 | Eckert | Aug. 10, 1954 |
| 2,734,187 | Rajchman | Feb. 7, 1956 |
| 2,764,687 | Buchanan | Sept. 25, 1956 |
| 2,769,968 | Schultheis | Nov. 6, 1956 |
| 2,776,419 | Rajchman et al. | Jan. 1, 1957 |